US006929275B1

(12) United States Patent
Schlangen

(10) Patent No.: US 6,929,275 B1
(45) Date of Patent: Aug. 16, 2005

(54) PERSON TRANSPORT WHEELCHAIR

(75) Inventor: Phillip E. Schlangen, Minneapolis, MN (US)

(73) Assignee: Kurt Manufacturing Company, Minneapolis, MN (US)

( * ) Notice: Subject to any disclaimer, the term of this patent is extended or adjusted under 35 U.S.C. 154(b) by 0 days.

(21) Appl. No.: 10/425,187

(22) Filed: Apr. 28, 2003

Related U.S. Application Data

(63) Continuation of application No. 29/141,713, filed on May 14, 2001, now Pat. No. Des. 474,999, and a continuation of application No. 29/141,937, filed on May 17, 2001, now Pat. No. Des. 473,826.

(51) Int. Cl.[7] .......................... B62M 1/14; B62B 1/00; B62B 3/00; A47C 7/00; B25G 3/36

(52) U.S. Cl. .............................. 280/250.1; 280/47.25; 280/647; 280/79.11; 280/47.11; 280/47.131; 297/440.15; 297/440.16; 297/440.2; 297/440.21; 297/230.13; 403/396; 403/391; 403/387

(58) Field of Search ......................... 280/47.25, 47.24, 280/47.17, 47.131, 47.27, 47.28, 47.2, 647, 280/648, 650, 657, 658, 79.2, 79.11, 5.26, 280/5.28, 5.24, 250.1; 180/8.2, 907; 297/440.15, 297/440.16, 440.2, 230.13, 440.21; 403/384, 403/387, 388, 389, 396, 391

(56) References Cited

U.S. PATENT DOCUMENTS

| | | | | | |
|---|---|---|---|---|---|
| 2,670,216 | A | * | 2/1954 | Leonard | 280/643 |
| 2,832,397 | A | * | 4/1958 | Premo | 297/440.15 |
| 2,957,700 | A | * | 10/1960 | Beaurline | 280/47.19 |
| 3,245,715 | A | * | 4/1966 | Gits | 297/59 |
| 3,857,606 | A | | 12/1974 | Rodaway | |
| 3,976,155 | A | * | 8/1976 | Esch | 280/32.5 |
| 4,097,169 | A | * | 6/1978 | Kelly | 403/391 |
| 4,575,113 | A | * | 3/1986 | Boudreau | 280/650 |
| 4,583,758 | A | * | 4/1986 | Runion et al. | 280/644 |
| 4,967,864 | A | * | 11/1990 | Boyer et al. | 180/65.1 |
| 4,997,200 | A | * | 3/1991 | Earls | 280/648 |
| 5,141,250 | A | * | 8/1992 | Morgan et al. | 280/250.1 |
| 5,267,745 | A | * | 12/1993 | Robertson et al. | 280/250.1 |
| D359,260 | S | | 6/1995 | Shriver | |
| 5,542,690 | A | * | 8/1996 | Kozicki | 280/304.1 |
| 5,573,261 | A | * | 11/1996 | Miller | 280/250.1 |
| 5,697,628 | A | * | 12/1997 | Spear | 280/304.1 |
| 5,722,676 | A | * | 3/1998 | Wu | 280/250.1 |
| 6,000,713 | A | * | 12/1999 | Lin | 280/647 |
| D430,078 | S | | 8/2000 | Ellis et al. | |
| 6,220,621 | B1 | * | 4/2001 | Newton | 280/650 |
| D451,435 | S | | 12/2001 | Schlangen | |

FOREIGN PATENT DOCUMENTS

| | | | | |
|---|---|---|---|---|
| DE | 3826381 C1 | * | 12/1989 | B62B 7/02 |
| GB | 2084009 | * | 9/1980 | 297/440.15 |

* cited by examiner

*Primary Examiner*—Christopher P. Ellis
*Assistant Examiner*—G B Klebe
(74) *Attorney, Agent, or Firm*—Richard O. Bartz

(57) ABSTRACT

A person transport wheelchair has a frame assembly with tubular members attached to connectors supporting a seat, a back rest, and a foot rest. A pair of wheels rotatably mounted on an axle secured to the frame assembly movably support the wheelchair on a surface. The connectors have joined parallel tubes and a flange on one tube. The tubular members have ends telescoped into the tubes. The flanges support the seat, back rest and foot rest.

26 Claims, 11 Drawing Sheets

PERSON TRANSPORT WHEELCHAIR

This application is a continuation of Ser. No. 29/141,713 filed May 14, 2001 now U.S. Pat. No. Des 474,999 and is a continuation of Ser. No. 29/141,937 filed May 17, 2001 now U.S. Pat. No. Des 473,826.

FIELD OF THE INVENTION

The invention is in the art of person transport chairs having frame assemblies with tubular members and connectors joined without welds. The person transport chair is a two wheeled hand truck having a seat, back rest, and foot rest for accommodating a person and transporting the person to a selected location.

BACKGROUND OF THE INVENTION

Conventional wheelchairs have large wheels and caster wheels rotatably mounted on axles and spindles secure to frames. An example of wheelchairs are disclosed by K. S. Rodaway in U.S. Pat. No. 3,857,606 and J. L. Shriver in U.S. Pat. Des. 359,260. The frames of conventional wheelchairs have metal plates and tubular members secured together with welds. The welding of wheelchair frames is labor intensive and an expensive fabrication operation. The components of welded wheelchair frames are not adjustable to allow for different wheelchair sizes and dimensions. Individual wheelchair frames must be welded for different wheelchair designs, sizes, and shapes. Wheelchairs with broken welded frames are not repaired at the user's location. They are shipped to a welding shop or the manufacturer for repairs and part replacements. A replacement wheelchair must be available for the user. Conventional wheelchairs have relatively wide dimensions and external side wheels which restrict movement along narrow doorways and walkways, such as the passenger walkways of commercial aircraft. These wheelchairs are not useable to transport relatively immobile and physically challenged persons to and from seats on a commercial aircraft.

SUMMARY OF THE INVENTION

The invention is a two wheeled hand chariot comprising a chair for moving a person to a desired location. The chair is a manually movable wheelchair having a frame assembly supporting a seat, a back rest and a foot rest. The frame assembly has tubular members fastened to connectors which retain the frame assembly as a unitary structure. Removable fasteners secure the connectors to the tubular members. Welds are not used to connect tubular members and plates in the frame assembly. Tubular members and connectors can be individually replaced at the location of the wheelchair with conventional hand tools. Connectors having the same structures are used to assemble different sized wheelchairs. The connectors include support for the seat, back rest and foot rest. The connectors have parallel tubes linearly joined together. Each tube has a longitudinal passage for telescopingly accommodating a tubular member. Fasteners, such as bolt and nut assemblies, secure the connectors to the tubular members. The support associated with the connectors are longitudinal flanges joined to the sides of one of the tubes. The seat, back rest and hand rest are secured with fasteners, such as bolts, to the flanges of adjacent parallel connectors. A pair of wheels are rotatably mounted on a transverse axle extended between and connected to the frame assembly. The frame assembly extends upwardly from the wheels to a pair of transverse handles used by a person to tilt the wheelchair backward and move the wheelchair along a support surface.

DETAILED DESCRIPTION OF THE INVENTION

Figure 1:
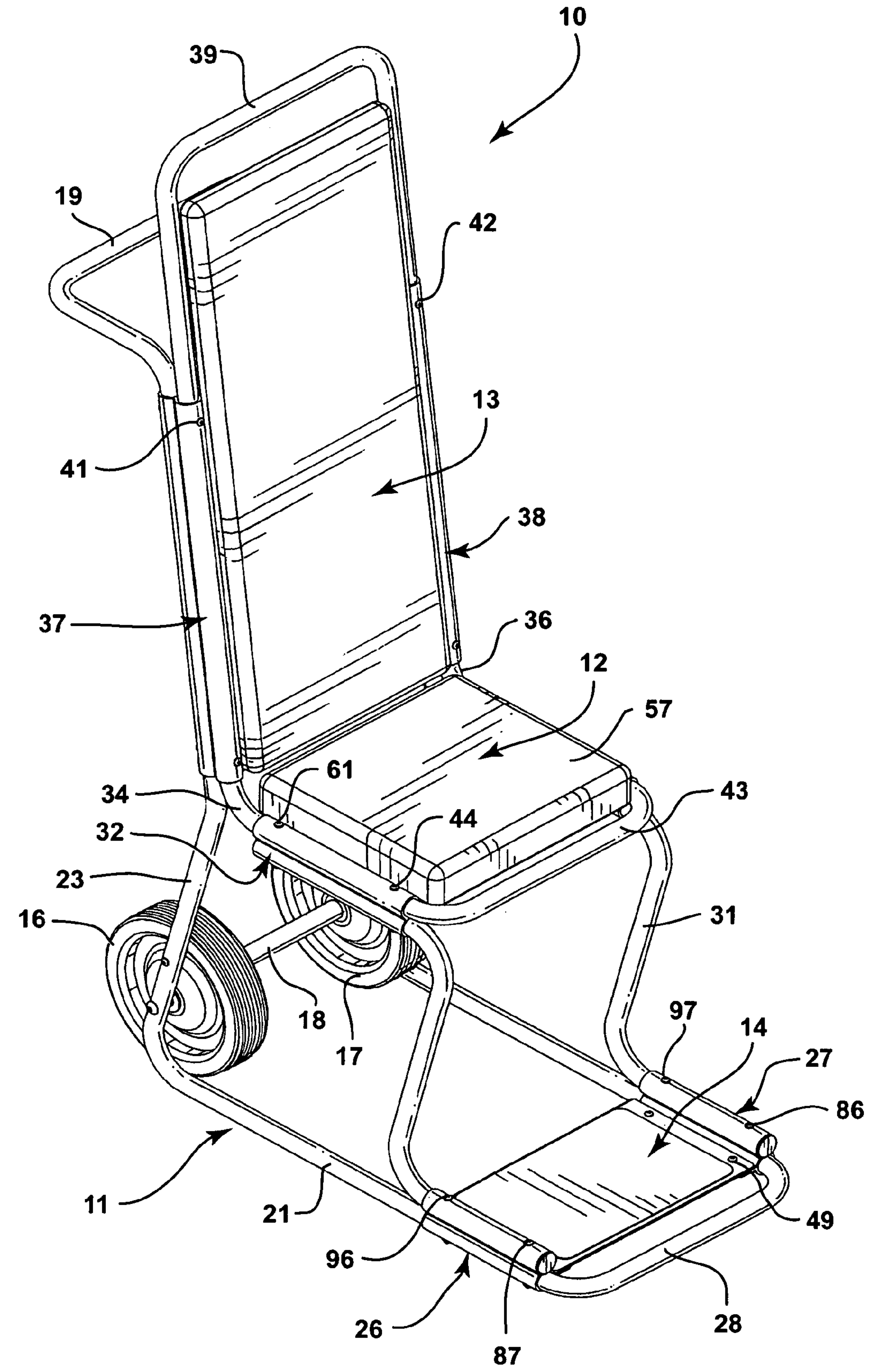
FIG. 1 is a perspective view of the person transport wheelchair of the invention.

A person transport wheelchair 10, shown in FIGS. 1, 2, 4 and 5, is a narrow chair useable to carry a person along narrow paths, such as narrow doorways, passageways, halls and the aisles of commercial aircraft. Wheelchair 10 has a frame assembly 11 connected to a horizontal seat 12 and an upright back rest 13. The front of the frame assembly supports a horizontal foot rest 14. Frame assembly 11 is movably supported on a surface, such as a floor, with a pair of wheels 16 and 17. A transverse axle 18 connected to frame assembly 11 rotatably supports wheels 16 and 17. A first U-shaped handle 19 extends rearwardly from an upper portion of back rest 13 and frame assembly 11 supporting back rest 13. Handle 19 is used with a second handle 39 by a person to tilt wheelchair 10 rearward to support wheelchair 10 on wheels 16 and 17 and roll wheelchair 10 carrying a person along a surface to a selected location.

Frame Assembly 11 has a pair of horizontal base tubular members 21 and 22 joined to upwardly and forwardly inclined rear portions or arms 23 and 24. Axle 18 extends between and is connected to the lower sections of arms 23 and 24. Wheels 16 and 17 are rotatably mounted on axle 18 adjacent the insides of arms 23 and 24. The forward ends of members 21 and 22 are secured to tubular connectors 26 and 27 with releasable fasteners 96 and 97, such as bolt and nut assemblies. A U-shaft bumper 28 attached to connectors 26 and 27 with releasable fasteners 86 and 87 extends transversely in front of foot rest 14. Frame assembly 11 has a pair of Z-shaped front arms 29 and 31 attached to foot rest connectors 26 and 27 with fasteners 96 and 97 and seat connectors 32 and 33 with releasable fasteners 44 and 46. A pair of elbow tubes 34 and 36 are attached with releasable fasteners 60 and 61 to seat connectors 32 and 33 and upright back rest connectors 37 and 38. First handle 19 is attached to the upper ends of back rest connectors 37 and 38. An invested U-shaped member or second handle 39 surrounding the upper end of back rest 13 is attached to back rest connectors 37 and 38 with releasable fasteners 41 and 42. Fasteners 41 and 42 are bolts that also attach handle 19 to back rest connectors 37 and 38. A U-shaped member 43 located transversely in front of seat 12 is attached with fasteners 44 and 46 to seat connectors 32 and 33. The frame assembly 11 is described as having tubular members. Rods and bars can be used with the connectors to provide a unitary frame structure.

Figure 2:
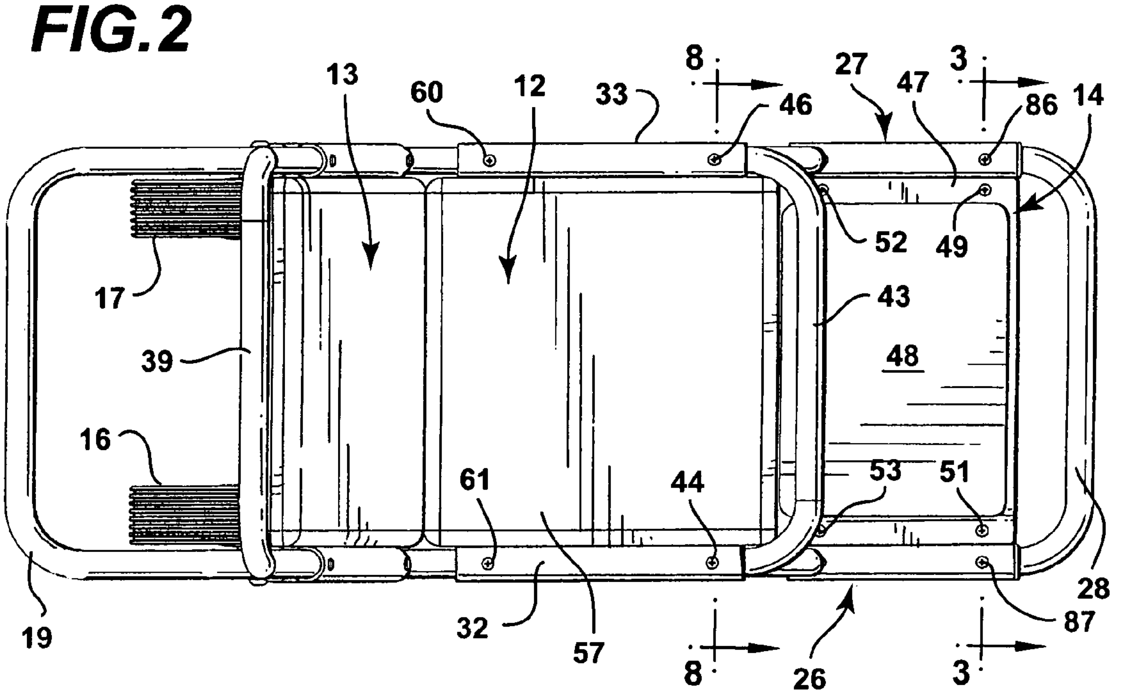
FIG. 2 is a top plan view thereof.
Figure 3:
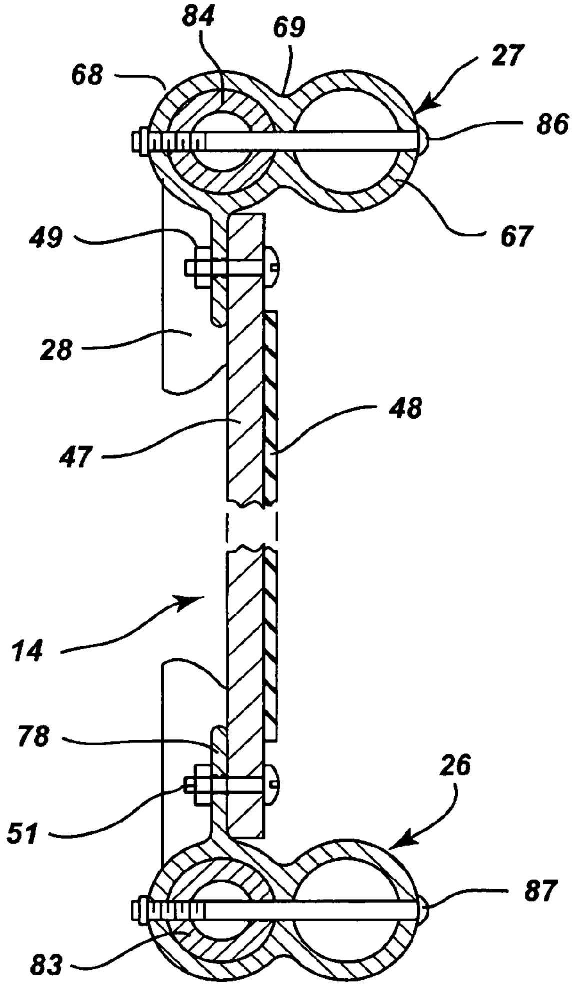
FIG. 3 is an enlarged foreshortened sectional view taken along line 3—3 of FIG. 2.
Figure 10:
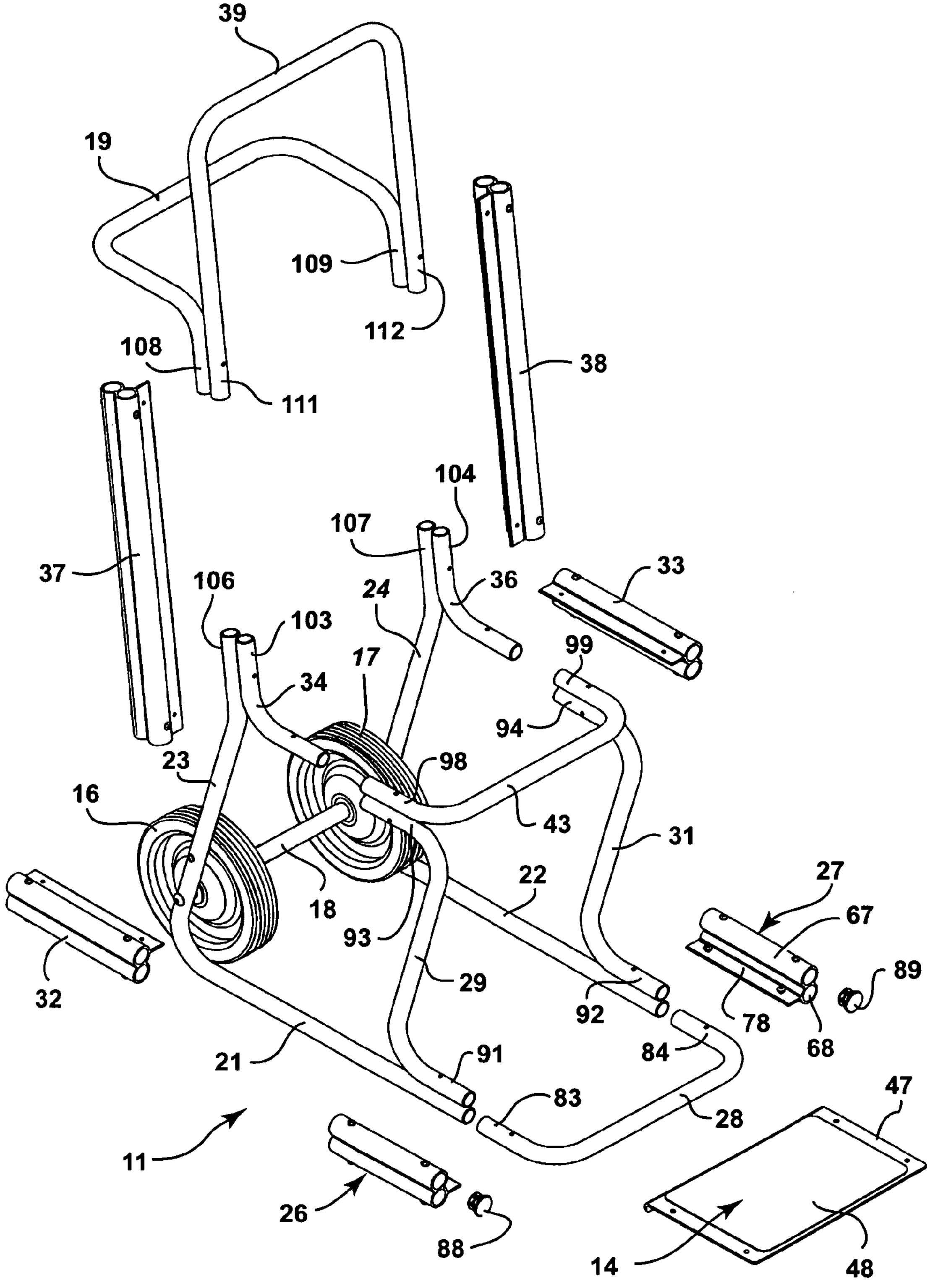
FIG. 10 is an exploded perspective view of the person transport wheelchair of FIG. 1 without the seat and back rest pads.

Foot rest 14, shown in FIGS. 2 and 3, has a flat horizontal plate 47 extended between foot rest connectors 26 and 27. Bolts 49, 51, 52 and 53 attach opposite ends of plate 47 to connectors 26 and 27. Plate 47 is a metal member. Other rigid materials, such as wood, plastic and composites, can be used in lieu of metal plate 47. A mat 48 of rubber or rubber-like material is secured to the top of plate 47. As shown in FIGS. 1 and 10, foot rest 14 is horizontally aligned with base tubular members 21 and 22. When wheelchair 10 is in the upright position, foot rest 14 is located horizontally adjacent the floor or support surface so that a person can easily place their feet on mat 48 and sit on seat 12.

Figure 8:
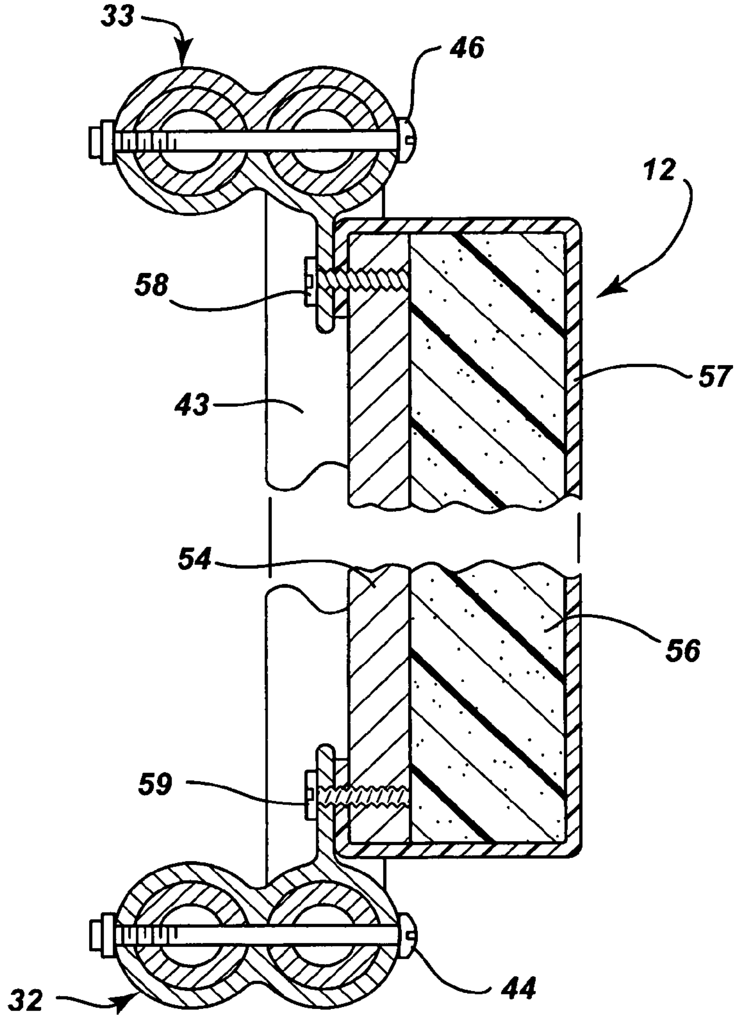
FIG. 8 is an enlarged foreshortened sectional view taken along the line 8—8 of FIG. 2.
Figure 9:
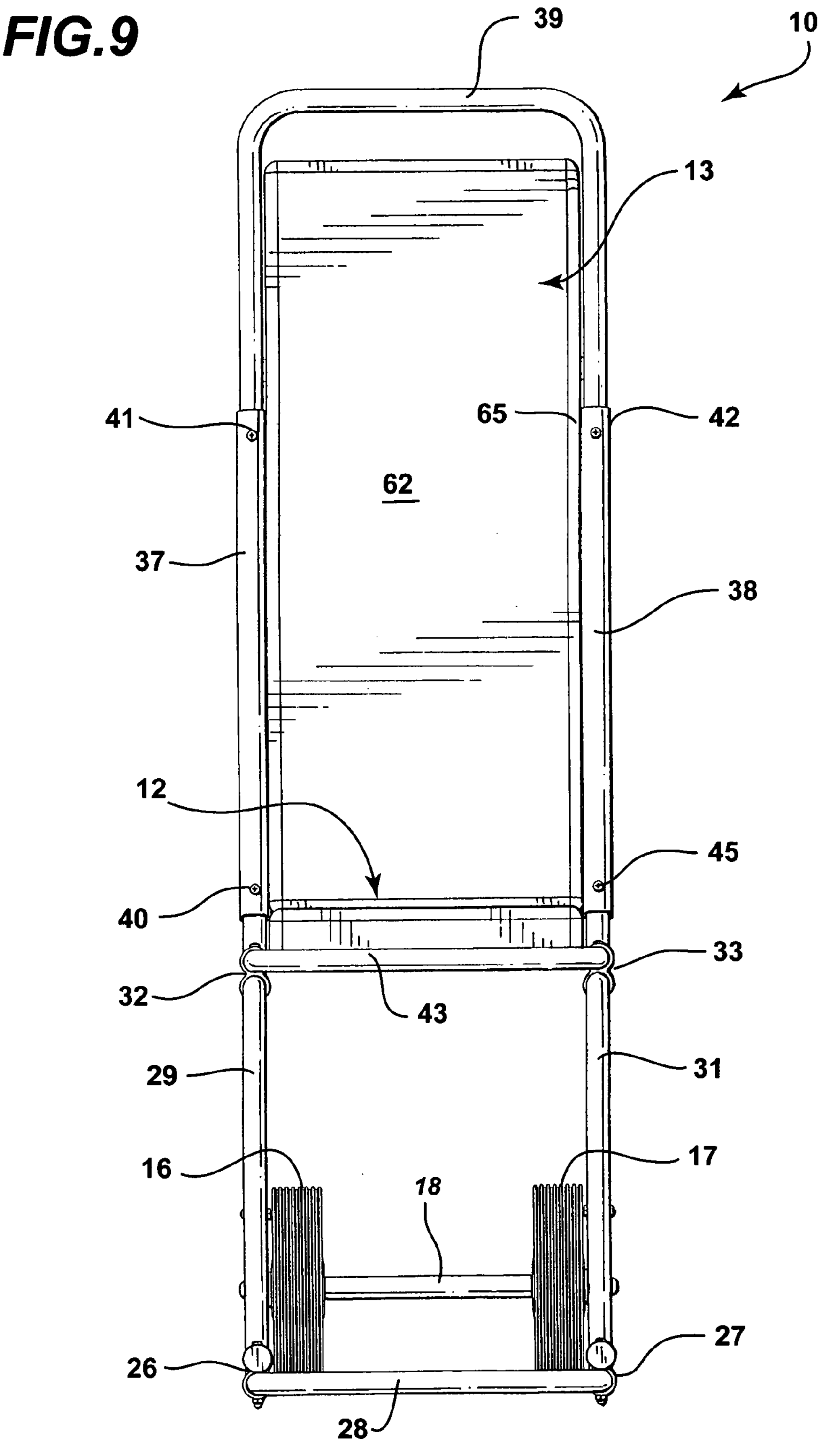
FIG. 9 is a front elevational view thereof.

Seat 12, shown in FIGS. 1, 2 and 8, has a flat plate or base member 54 supporting a cushion 56 of foam plastic or a similar pad of soft material. A cover 57 surrounds cushion 56 and the outer edges of plate 54. Cover 57 is a flexible sheet of fabric, plastic, canvas, or leather. Bolts 58, 59, 60 and 61 attach plate 54 and cover 57 to seat connectors 32 and 33. U-shaped member 43 spaced in front of the front edge of seat 12 protects the front of seat 12 and provides a hand grip for the person seated on the wheelchair.

Figure 4:
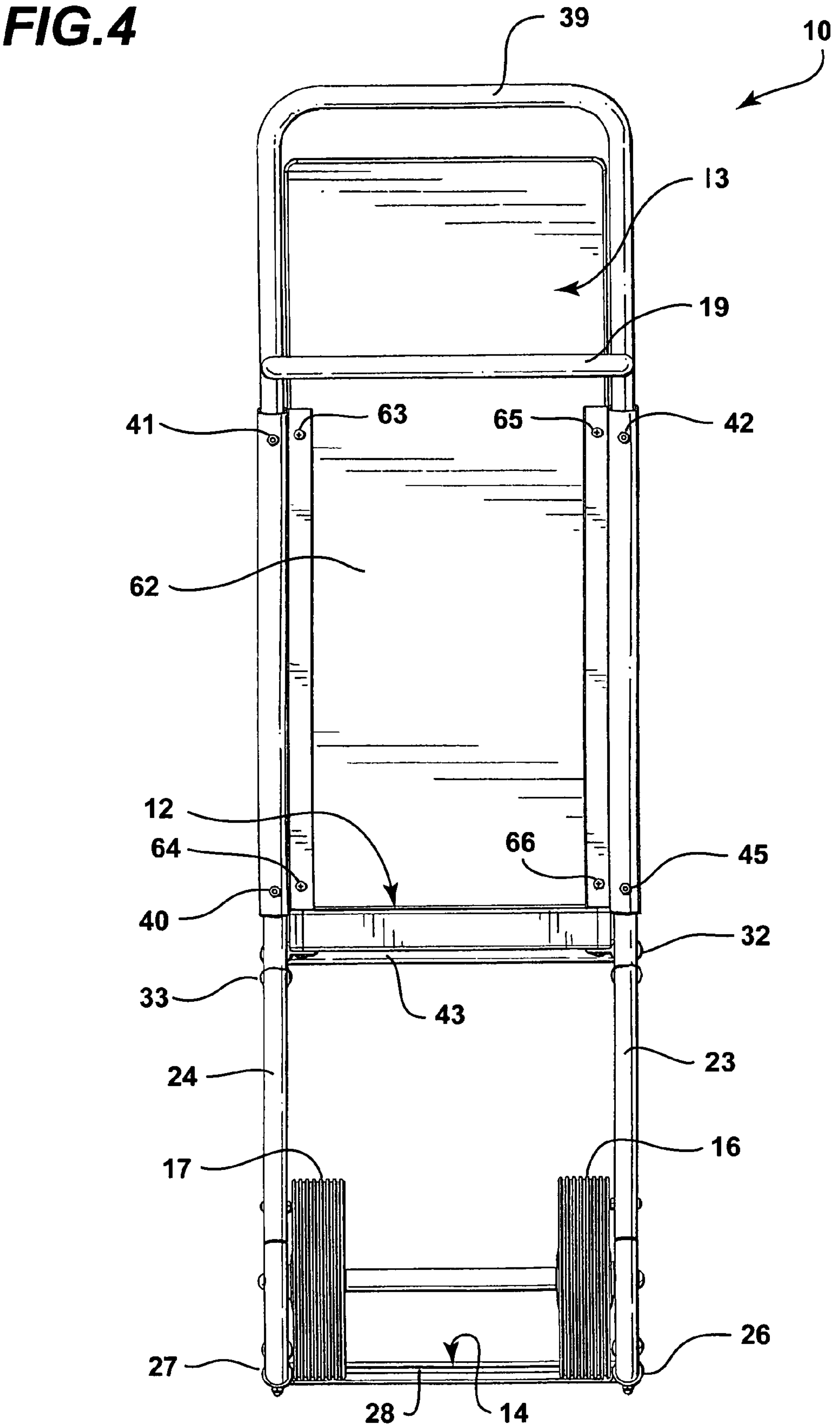
FIG. 4 is a rear elevational view thereof.
Figure 5:
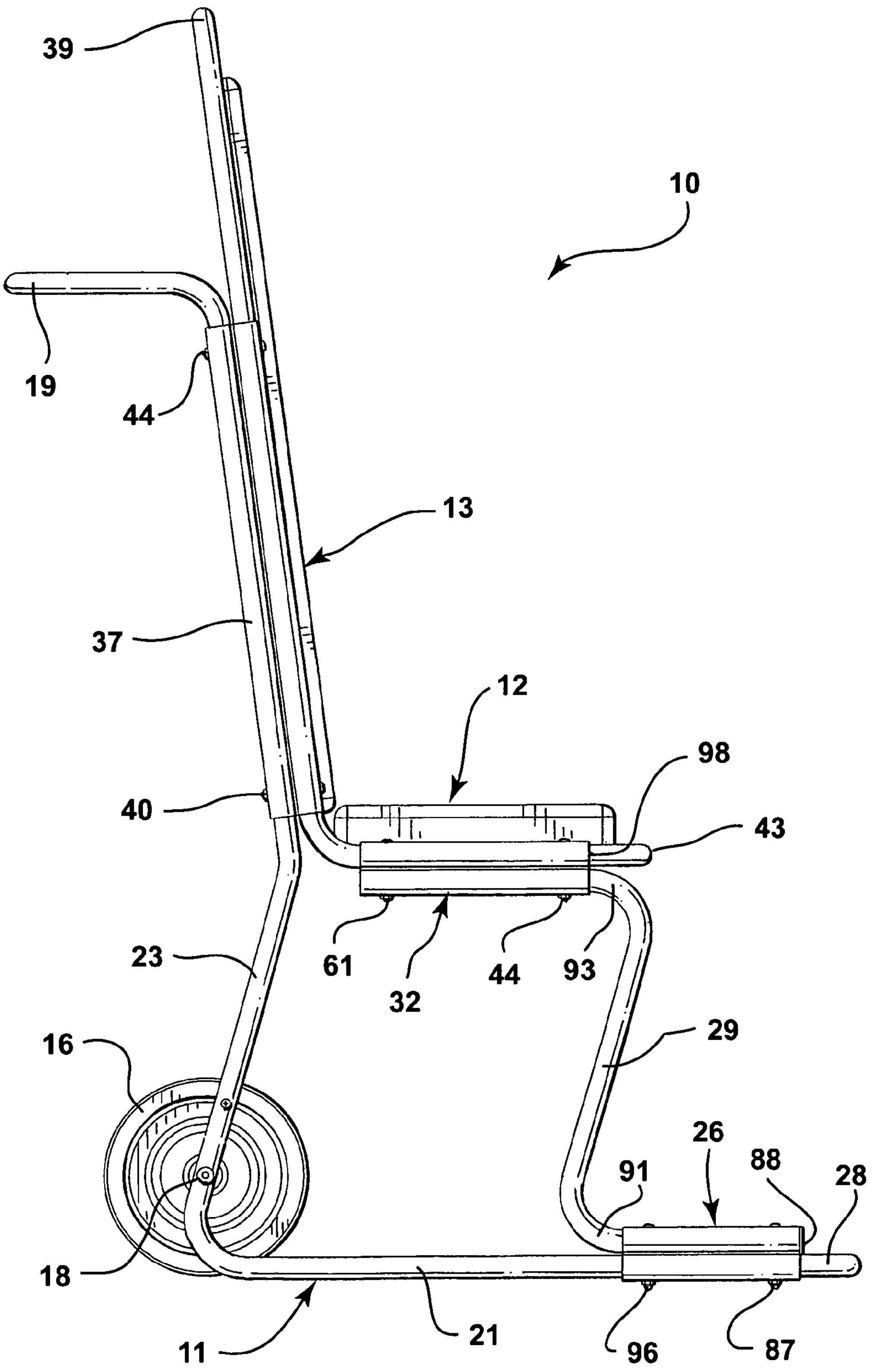
FIG. 5 is a side elevational view of the right side thereof.
Figure 6:
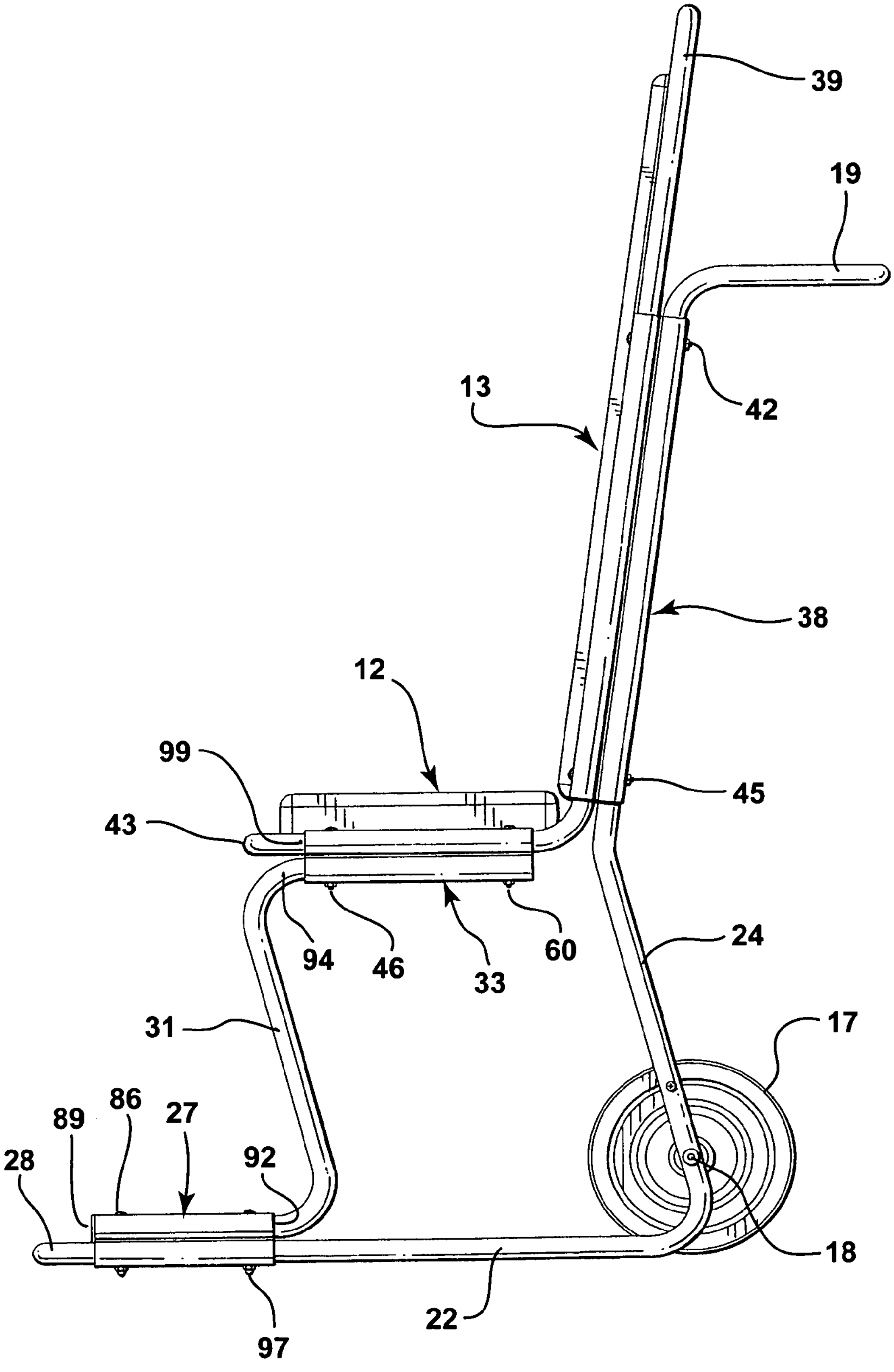
FIG. 6 is a side elevational view of the left side thereof.
Figure 7:
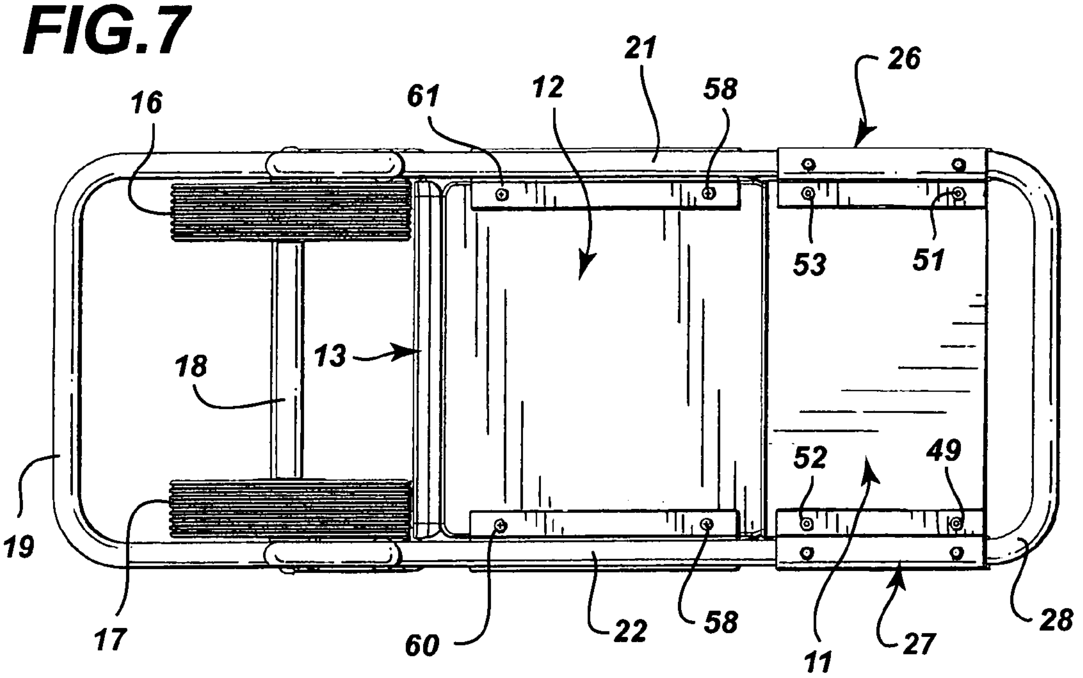
FIG. 7 is a bottom plan view thereof.

Back rest 13 has an upright rectangular panel 62 attached with bolts 63, 64, 65, and 66, shown in FIG. 4, to back rest connectors 37 and 38. Panel 62 has a plate and a cushion or resilient pad located within a cover. An example of panel 62 is the same structure as seat 12 shown in FIG. 8. Inverted U-shaped member 39 has transverse second handle spaced above the top edge of back rest 13 used by a person as a hand grip to tilt wheelchair backward to a transport position to balance the load on wheelchair 10 on wheels 16 and 17.

Figure 11:
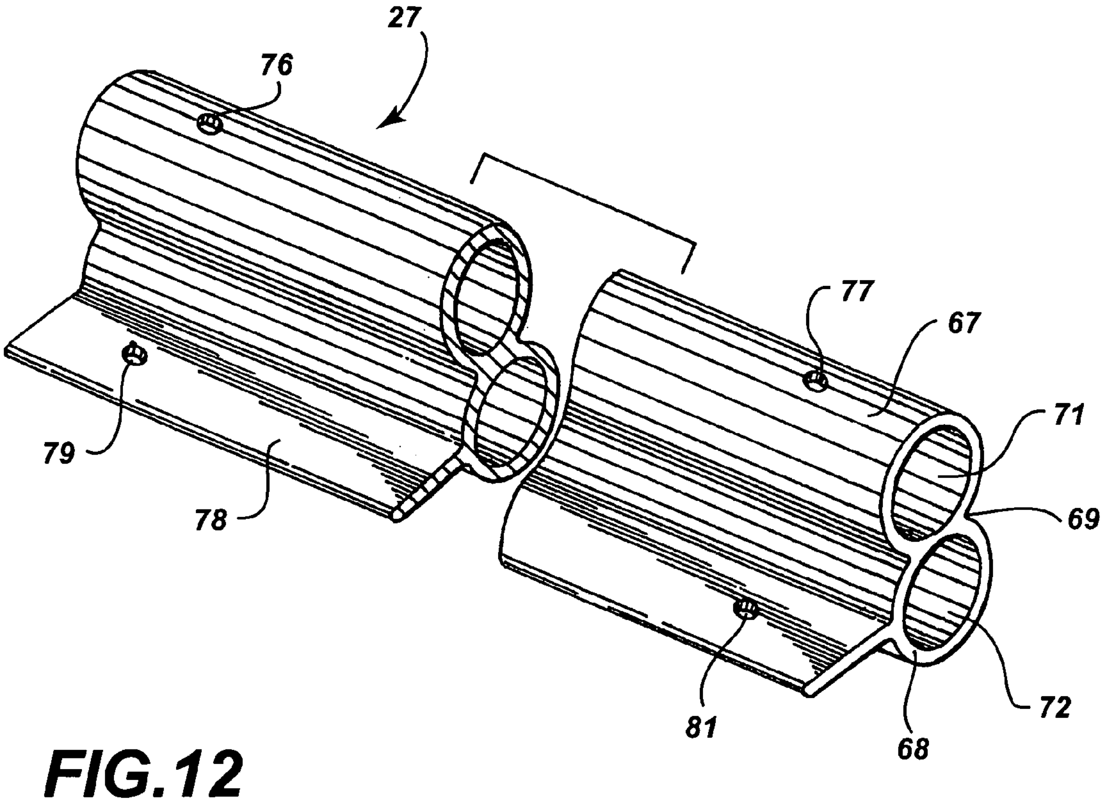
FIG. 11 is a foreshortened perspective view of a tube connector used in the person transport wheelchair of FIG. 1.
Figure 12:
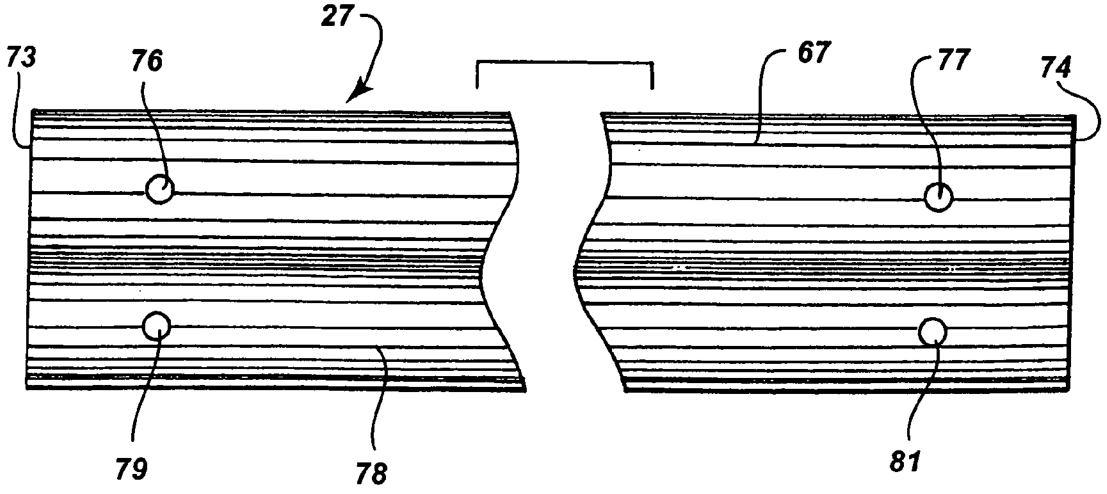
FIG. 12 is an enlarged foreshortened top plan view of the tube connector of FIG. 1.
Figure 13:
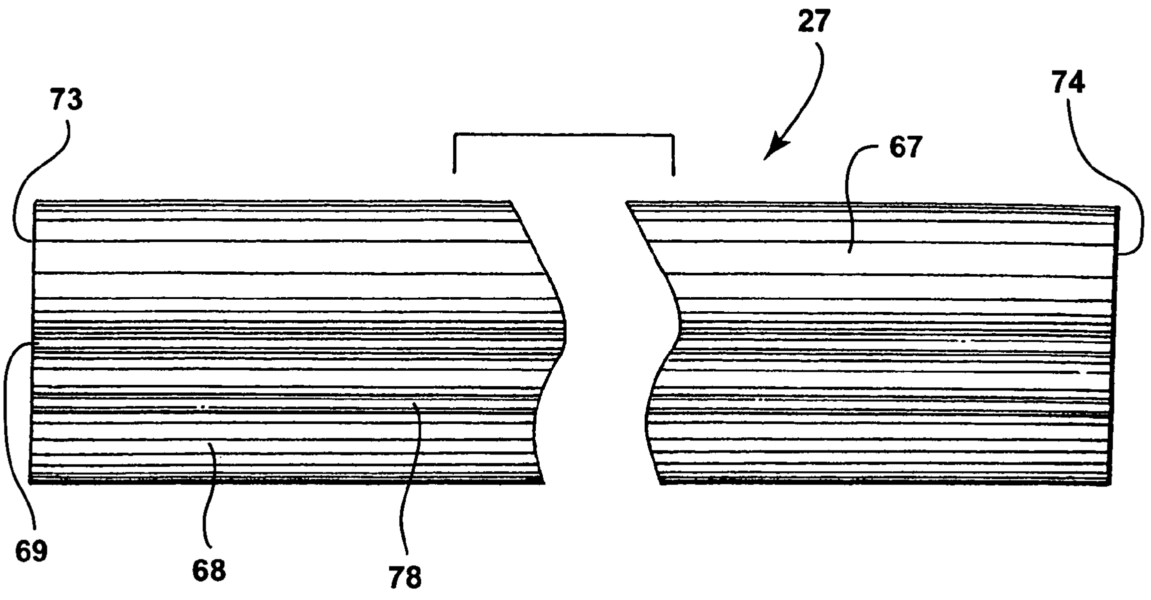
FIG. 13 is an enlarged foreshortened front elevational view of the tube connector of FIG. 11.
Figure 14:
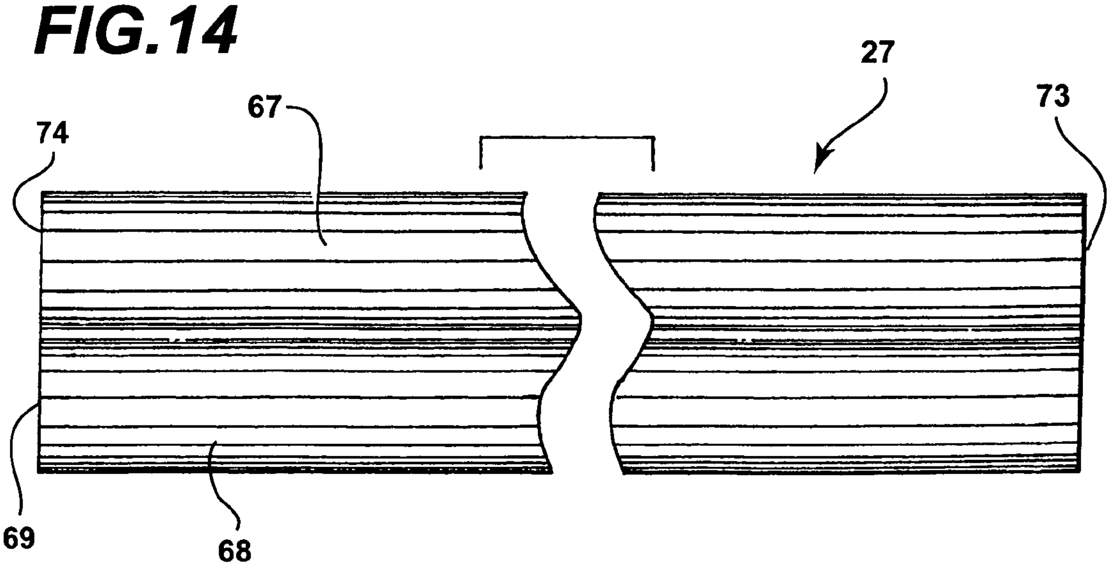
FIG. 14 is an enlarged foreshortened rear elevational view of the tube connector of FIG. 11.
Figure 15:
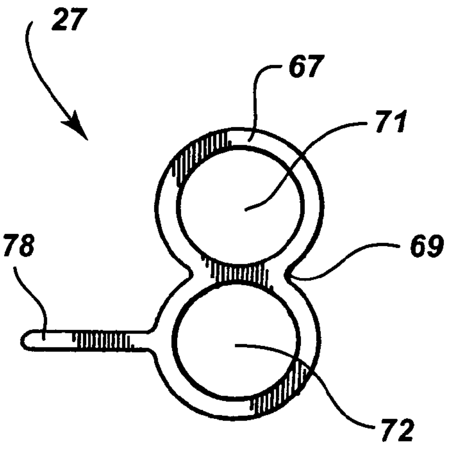
FIG. 15 is an enlarged end elevational view of the right end of the tube connector of FIG. 11.
Figure 16:
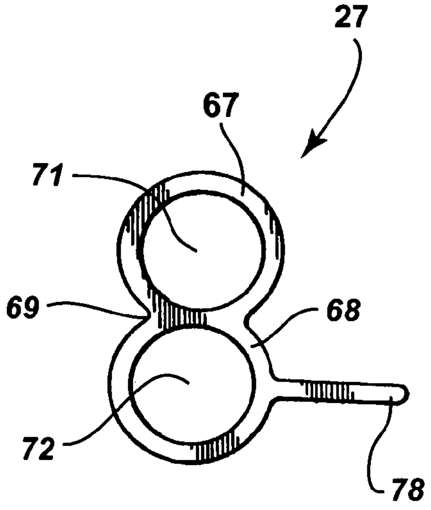
FIG. 16 is an enlarged end elevational view of the left end of the tube connector of FIG. 11.
Figure 17:
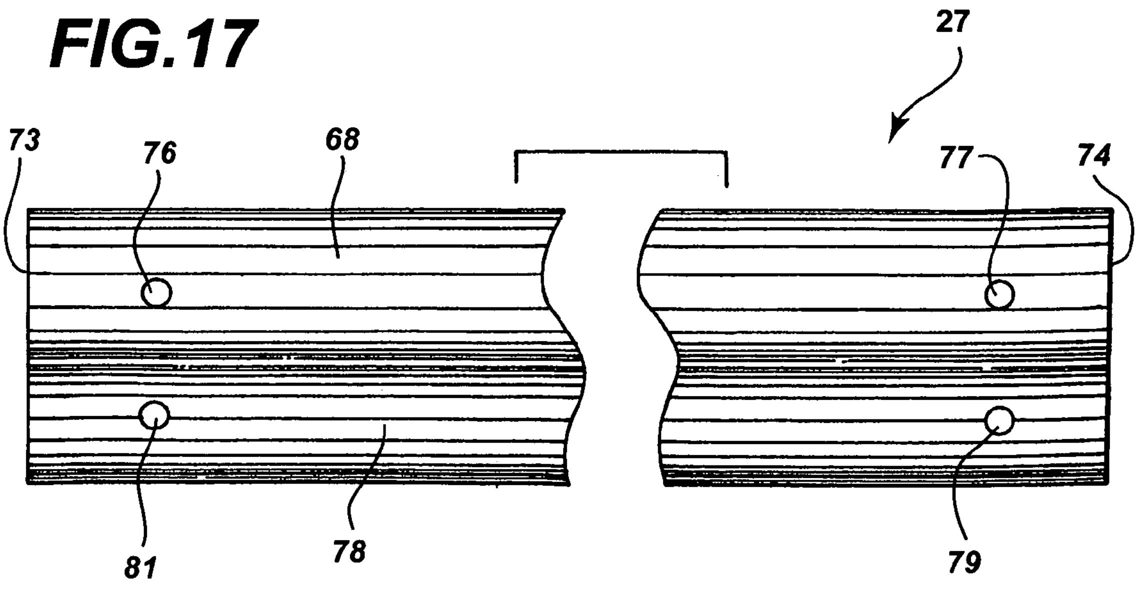
FIG. 17 is an enlarged foreshortened bottom plan view of FIG. 11.

The tubular members of frame 11 are attached with connectors 26, 27, 32, 33, 37 and 38 and bolts cooperating with the tubular members and connectors. Welds are not used to secure tubular members or other parts together. Connectors 26, 27, 32, 33, 37 and 38 have the same structure with different lengths. FIGS. 11 to 17 show the details of connector 27. Connector 27 is a one-piece extruded metal member having a pair of tubes 67 and 68 joined at an adjacent wall 69 to position tubes 67 and 68 parallel to each other. Tubes 67 and 68 have parallel cylindrical passages 71 and 72 and transverse opposite ends 73 and 74. Vertical holes 76 and 77 extend through tubes 67 and 68 adjacent opposite ends thereof. As shown in FIGS. 11, 15, and 16, joined tubes 67 and 68 have a figure eight cross section. The cross section is the representation in outline of the number 8. Passages 71 and 72 have the same diameters to accommodate common tubular members. A flat longitudinal flange or rib 78 is joined to a side of tube 68. The flanges on the seat, back and foot rest connectors 32, 33, 37, 38 and 26, 27 are supports for the seat 12, back rest 13 and foot rest 14. The adjacent ends of tubular members located in the parallel passages of the joined tubes prevent rotation of the connectors relative to the tubular members. Flange 78 has a pair of holes 79 and 81 adjacent the opposite ends thereof. Holes 79 and 81 see transversely aligned with holes 76 and 77 in tube 67. Flange 78 extends along the entire length of tube 68 and has a width substantially the same as the outer diameter of tube 68. Tubes 67 and 68 can have different inside diameters and shapes. Tube 67 can be larger than tube 68. Alternatively, tube 68 can be larger than tube 67. Tubes 67 and 68 can be square tubes as shown in FIGS. 9 to 16 of U.S. Pat. No. D473,826 incorporated herein by reference.

As shown in FIG. 10, U-shaped bumper 28 has longitudinal ends 83 and 84 axially aligned with base members 21 and 22 which telescope into tube 68. Bolt 86 secures end 84 to tube 68. A second bolt 87 secures end 83 to connector 26. Plugs 88 and 89 close the open ends of the upper tubes of connectors 26 and 27. Front arms 29 and 31 have horizontal lower ends 91 and 92 and horizontal upper ends 93 and 94. The lower ends 91 and 92 and forward ends of base members 21 and 22 telescope into the passages of connectors 26 and 27 and are secured thereto with bolts 96 and 97. The upper ends 93 and 94 of arms 29 and 31 telescope into the lower passages of seat connectors 32 and 33 and are secured thereto with bolts 44 and 46. Bolts 44 and 46 also secure the ends 98 and 99 of U-shaped member 43 to seat connectors 32 and 33. Elbow tubes 34 and 36 have horizontal ends 101 and 102 telescoped into connectors 32 and 33 and secured thereto with bolts 60 and 61 and upright ends 103 and 104 telescoped into connectors 37 and 38 and connected thereto with bolts 40 and 45. Arms 23 and 24 have upper ends 106 and 107 telescoped into connectors 37 and 38. Bolts 40 and 45 also attach ends 106 and 107 to connectors 37 and 38. Handle 19 has downwardly turned ends 108 and 109 telescoped into connectors 37 and 38 and attach with bolts 41 and 42 to the upper ends of connectors 37 and 38. Second handle 39 has lower ends 111 and 112 telescoped in the upper ends of connectors 37 and 38. Bolts 41 and 42 also attach ends 111 and 112 to connectors 37 and 38. The entire wheelchair is assembled with conventional hand tools. Seat 12, back rest 13 and foot rest 14 can be removed from frame assembly 11 for repair or replacement without disassembling frame assembly 11.

There has been shown and described an embodiment of the person transport wheelchair of the invention. Changes in the materials, structures and arrangement of the structures of the person transport wheelchair can be made by persons skilled in the art without departing form the invention.

What is claimed is:

1. A person transport wheelchair comprising: a frame assembly having members, connectors attached to the members, and releasable fasteners securing the members to the connectors, said connectors including a pair of seat connectors, a pair of back rest connectors, and a pair of foot rest connectors, each of the connectors including a pair of tubes joined together, each tube having a passage, said members being tubular members having ends, each end being telescoped into the passage of one tube, said releasable fasterners attaching the ends of the tubular members to the tubes, a seat mounted on the seat connectors, first fasteners securing the seat to the seat connectors, a back rest mounted on the back rest connectors, second fasteners securing the back rest to the back rest connectors, a foot rest mounted on the foot rest connectors, third fasteners securing the foot rest to the foot rest connectors, wheels mounted on the frame assembly for movably supporting the wheelchair on a surface, and an axle secured to the frame assembly rotatably supporting the wheels.

2. The person transport wheelchair of claim 1 including: a flange secured to a tube of each connector.

3. The person transport wheelchair of claim 1 wherein: said seat connectors include flanges joined to tubes supporting the seat, said first fasteners securing the seat to said flanges.

4. The person transport wheelchair of claim 1 wherein: said back rest connectors include flanges joined to tubes, said back rest being mounted on the flanges, said second fasteners attaching the back rest to the flanges.

5. The person transport wheelchair of claim 1 including: a U-shaped member located transversely in front of the seat, and means attaching the U-shaped member to the seat connectors.

6. The person transport wheelchair of claim 1 including: a first handle and a second handle, each handle having ends attached to the back rest connectors.

7. The person transport wheelchair of claim 1 including: a handle attached to the back rest connectors.

8. The person transport wheelchair of claim 7 wherein: said handle is a U-shaped member extended rearwardly from the back rest.

9. The person transport wheelchair of claim 1 wherein: the members include generally horizontal base members, upright front arms connected to the seat connectors, upright rear arms joined to the base members and connected to the back rest connectors, a pair of elbow members connected to the seat connectors and back rest connectors, at least one handle located adjacent said back rest, and fasteners attaching said handle to the back rest connectors.

10. The person transport wheelchair of claim 9 wherein: each of the seat connectors have flanges joined to a tube supporting said seat, said first fasteners securing said seat to said flanges.

11. The person transport wheelchair of claim 9 including: an axle mounted on the upright rear arms for rotatably supporting the wheel means, said wheel means being located adjacent inside portions of said upright rear arms.

12. A person transport wheelchair comprising: a frame assembly having members, connectors attached to the members, and releasable fasteners securing the members to the connectors, said connectors including a pair of seat connectors, a pair of back rest connectors, and a pair of foot rest connectors, each of the connector including a pair of tubes joined together each tube having a passage, said members being tubular members having ends, each end being telescoped into the passage of one tube, said releasable fasteners attaching the ends of the tubular members to the tubes, a seat mounted on the seat connectors, first fasteners securing the seat to the seat connectors, a back rest mounted on the back rest connectors, second fasteners securing the back rest to the back rest connectors, a foot rest mounted on the foot rest connectors, third fasteners securing the foot rest to the foot rest connectors, wheels mounted on the frame assembly for movably supporting the wheelchair on a surface, and an axle secured to the frame assembly rotatably supporting the wheels.

13. The person transport wheelchair of claim 12 including: a flange secured to a tube of each connector.

14. The person transport wheelchair of claim 12 wherein: said seat connectors include flanges joined to tubes supporting the seat, said first fasteners securing the seat to said flanges.

15. The person transport wheelchair of claim 12 wherein: said back rest connectors include flanges joined to tubes, said back rest being mounted on the flanges, said second fasteners attaching the back rest to the flanges.

16. The person transport wheelchair of claim 12 wherein: said foot rest connectors include flanges joined to tubes, said third fasteners securing the foot rest to the flanges.

17. The person transport wheelchair of claim 12 including: a U-shaped member located transversely in front of the seat, and means attaching the U-shaped member to the seat connectors.

18. The person transport wheelchair of claim 12 including: a first handle and a second handle, each handle having ends attached to the back rest connectors.

19. The person transport wheelchair of claim 12 including: a transverse bumper located in front of the foot rest, and means attaching the bumper to the foot rest connectors.

20. The person transport wheelchair of claim 12 including: a handle attached to the back rest connectors.

21. The person transport wheelchair of claim 20 wherein: said handle is a U-shaped member extended rearwardly from the back rest.

22. The person transport wheelchair of claim 12 wherein: the members include generally horizontal base members connected to the foot rest connectors, upright front arms connected to the foot rest connectors and seat connectors, upright rear arms joined to the base members and connected to the back rest connectors, a pair of elbow members connected to the seat connectors and back rest connectors, at least one handle located adjacent said back rest, and fasteners attaching said handle to the back rest connectors.

23. The person transport wheelchair of claim 22 wherein: each of the front arms have a Z-shape with horizontal lower ends connected to a foot rest connector and horizontal upper ends connected to a seat connector.

24. The person transport wheelchair of claim 22 wherein: each of the seat connectors have flanges joined to a tube supporting said seat, said first fasteners securing said seat to said flanges.

25. The person transport wheelchair of claim 22 wherein: said axle is mounted on the upright rear arms, said wheels being located adjacent inside portions of said upright rear arms.

26. The person transport wheelchair of claim 22 including: a transverse bumper located in front of the foot rest, and means attaching said bumper to said foot rest connectors.

* * * * *